(12) United States Patent
Chiu (10) Patent No.: US 10,712,787 B2
(45) Date of Patent: Jul. 14, 2020

(54) CHASSIS STRUCTURE

(71) Applicants:LITE-ON ELECTRONICS (GUANGZHOU) LIMITED, Guangzhou (CN); Lite-On Technology Corporation, Taipei (TW)

(72) Inventor: Liang-Cheng Chiu, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 15/889,178

(22) Filed: Feb. 5, 2018

(65) Prior Publication Data

US 2018/0232015 A1      Aug. 16, 2018

Related U.S. Application Data

(60) Provisional application No. 62/459,608, filed on Feb. 16, 2017.

(30) Foreign Application Priority Data

Jan. 4, 2018   (CN) .......................... 2018 1 0006901

(51) Int. Cl.
   *G06F 1/18*   (2006.01)
(52) U.S. Cl.
   CPC .............. *G06F 1/181* (2013.01); *G06F 1/183* (2013.01); *G06F 1/184* (2013.01); *G06F 1/188* (2013.01)

(58) Field of Classification Search
None
See application file for complete search history.

(56) References Cited

U.S. PATENT DOCUMENTS

| | | | | |
|---|---|---|---|---|
| 5,392,192 A | * | 2/1995 | Dunn | G06F 1/181 174/384 |
| 5,419,629 A | * | 5/1995 | Korinsky | G06F 1/182 312/223.2 |
| 6,496,366 B1 | * | 12/2002 | Coglitore | G06F 1/18 174/377 |
| 2005/0152106 A1 | | 7/2005 | Coster et al. | |
| 2007/0139902 A1 | * | 6/2007 | Chen | G06F 1/184 361/796 |

(Continued)

FOREIGN PATENT DOCUMENTS

| | | |
|---|---|---|
| CN | 2862160 | 1/2007 |
| CN | 201421581 | 3/2010 |

(Continued)

OTHER PUBLICATIONS

"Office Action of China Counterpart Application," dated Aug. 5, 2019, p.1-p.7.

(Continued)

*Primary Examiner* — Hanh V Tran
(74) *Attorney, Agent, or Firm* — JCIPRNET (57) ABSTRACT

A chassis structure including a box body and a plurality of assembling components is provided. The box body includes a main plate and a plurality of side plates, wherein the side plates surround a periphery of the main plate and define an accommodating space. The assembling components are bonded to the main plate and are located in the accommodating space.

18 Claims, 11 Drawing Sheets

(56) References Cited

U.S. PATENT DOCUMENTS

| | | | | |
|---|---|---|---|---|
| 2007/0217137 A1* | 9/2007 | Chen | G06F 1/181 | 361/807 |
| 2010/0002369 A1* | 1/2010 | Lee | G06F 1/181 | 361/679.33 |
| 2010/0014231 A1* | 1/2010 | Zhang | G06F 1/181 | 361/679.02 |
| 2010/0033925 A1* | 2/2010 | Zhang | G06F 1/181 | 361/679.58 |
| 2010/0142129 A1* | 6/2010 | Cheng | G06F 1/181 | 361/679.01 |
| 2010/0259883 A1* | 10/2010 | Yeh | G06F 1/187 | 361/679.33 |
| 2010/0260600 A1* | 10/2010 | Sun | G06F 1/181 | 415/213.1 |
| 2010/0264787 A1* | 10/2010 | Fan | G06F 1/184 | 312/223.2 |
| 2010/0265657 A1* | 10/2010 | Chen | G06F 1/184 | 361/679.58 |
| 2011/0164378 A1* | 7/2011 | Wu | G06F 1/184 | 361/679.58 |
| 2012/0327579 A1* | 12/2012 | Chen | G06F 1/184 | 361/679.6 |
| 2013/0044445 A1* | 2/2013 | Chiu | G06F 1/184 | 361/752 |
| 2013/0044453 A1* | 2/2013 | Tao | G06F 1/188 | 361/807 |
| 2013/0308285 A1* | 11/2013 | Tu | G06F 1/184 | 361/759 |
| 2015/0277513 A1* | 10/2015 | Farrow | G06F 1/184 | 361/679.32 |
| 2017/0164487 A1* | 6/2017 | Kim | H05K 7/142 | |
| 2017/0347481 A1* | 11/2017 | Kuan | H05K 7/1489 | |

FOREIGN PATENT DOCUMENTS

| | | |
|---|---|---|
| CN | 201725259 | 1/2011 |
| CN | 102841647 | 12/2012 |
| CN | 102937823 | 2/2013 |
| CN | 102955521 | 3/2013 |
| CN | 103885556 | 6/2014 |

OTHER PUBLICATIONS

"Office Action of China Counterpart Application," dated Dec. 3, 2019, p.1-p.8.

* cited by examiner

CHASSIS STRUCTURE

CROSS-REFERENCE TO RELATED APPLICATION

This application claims the priority benefit of U.S. provisional application Ser. No. 62/459,608, filed on Feb. 16, 2017 and China application serial no. 201810006901.X, filed on Jan. 4, 2018. The entirety of each of the above-mentioned patent applications is hereby incorporated by reference herein and made a part of this specification.

BACKGROUND OF THE INVENTION

Field of the Invention

The disclosure relates to a chassis structure, and in particular, to a chassis structure including a plurality of assembling components.

Description of Related Art

As technology advances, personal computers have been widely applied in work and life. Common personal computers currently include desktop computers and notebook computers.

In terms of desktop computers, a host chassis may be disassembled into a box body and a cover plate. Generally, the box body is formed by stacking two metal components, i.e., a first metal component and a second metal component. In a conventional manufacturing process, the first metal component is bent to form a main plate and two side plates (e.g., an upper side plate and a lower side plate) of the box body. Meanwhile, a second main plate is stamped and bent to form a mounting bracket disposed inside the main plate and two other opposite side plates (e.g., a front side plate and a rear side plate). The mounting bracket usually includes assembling structures for securing a motherboard, a power screw lock, a hard drive rack, etc. The front side plate and the rear side plate include through holes for exposing a motherboard or expansion cards, or slots for mounting a hard drive or an optical disk drive. Afterwards, the two metal components are combined (i.e., stacking the main plate and the mounting bracket and arranging the side plates to the relative positions), the side plates are connected by means of welding or riveting to form the box body, and the cover plate is covered to complete the host chassis. In the foregoing design, the box body is manufactured in two phases, which not only produces much waste material but also takes more labor and time.

SUMMARY OF THE INVENTION

The embodiments of the invention provide a chassis structure that saves manufacturing costs and simplifies a manufacturing process.

A chassis structure according to an embodiment of the invention includes a box body and a plurality of assembling components. The box body includes a main plate and a plurality of side plates, wherein the side plates surround a periphery of the main plate and define an accommodating space. The assembling components are bonded to the main plate and are located in the accommodating space.

In an embodiment of the invention, the main plate and the side plates form an integral structure.

In an embodiment of the invention, the side plates are combined with each other by riveting.

In an embodiment of the invention, each of the assembling components includes an assembling portion and two bonding portions.

In an embodiment of the invention, the assembling portion includes a bump.

In an embodiment of the invention, the assembling portion includes an assembling hole.

In an embodiment of the invention, each of the bonding portions includes a recessed portion.

In an embodiment of the invention, the assembling portion and the bonding portions are connected to each other along a first direction, and a length of the assembling portion along the first direction is greater than a width of each of the assembling components along a second direction perpendicular to the first direction.

In an embodiment of the invention, at least one of the assembling components and at least one of the side plates form an integral structure.

In an embodiment of the invention, at least one of the assembling components includes a first segment and a second segment, and the first segment and the second segment are connected to each other.

In an embodiment of the invention, the first segment has an hollow region.

In an embodiment of the invention, a shape of the hollow region corresponds to a shape of the second segment.

In an embodiment of the invention, the hollow region is closed.

In an embodiment of the invention, the first segment is connected to the side plate.

In an embodiment of the invention, the at least one of the assembling components includes a folded edge.

In an embodiment of the invention, the at least one of the assembling components includes an overlap region.

In an embodiment of the invention, an extension direction of the first segment is perpendicular to an extension direction of the second segment.

In an embodiment of the invention, at least one of the assembling components includes an annular structure.

In an embodiment of the invention, at least one of the assembling components includes a cradle.

In an embodiment of the invention, at least one of the assembling components includes an engaging hook.

Accordingly, the chassis structure of the embodiments of the invention provides a complete side plate through a single box body, and it is not necessary to separately manufacture and stack two box bodies to form the complete case as in the conventional design, so the manufacturing costs are thereby saved. Moreover, in the design described in the embodiments of the invention, it is not required to assemble two box bodies to each other as in the conventional case manufacturing process, and an advantage of process simplicity is thus achieved. Meanwhile, in the embodiments of the invention, the assembling components are disposed on the main plate by bonding instead of being disposed by other methods such as screw locking and riveting that require penetrating through the main plate. Therefore, smoothness and neatness of an external surface of the main plate can be maintained.

To provide a further understanding of the aforementioned and other features and advantages of the disclosure, exemplary embodiments, together with the reference drawings, are described in detail below.

DESCRIPTION OF THE EMBODIMENTS

Figure 1:
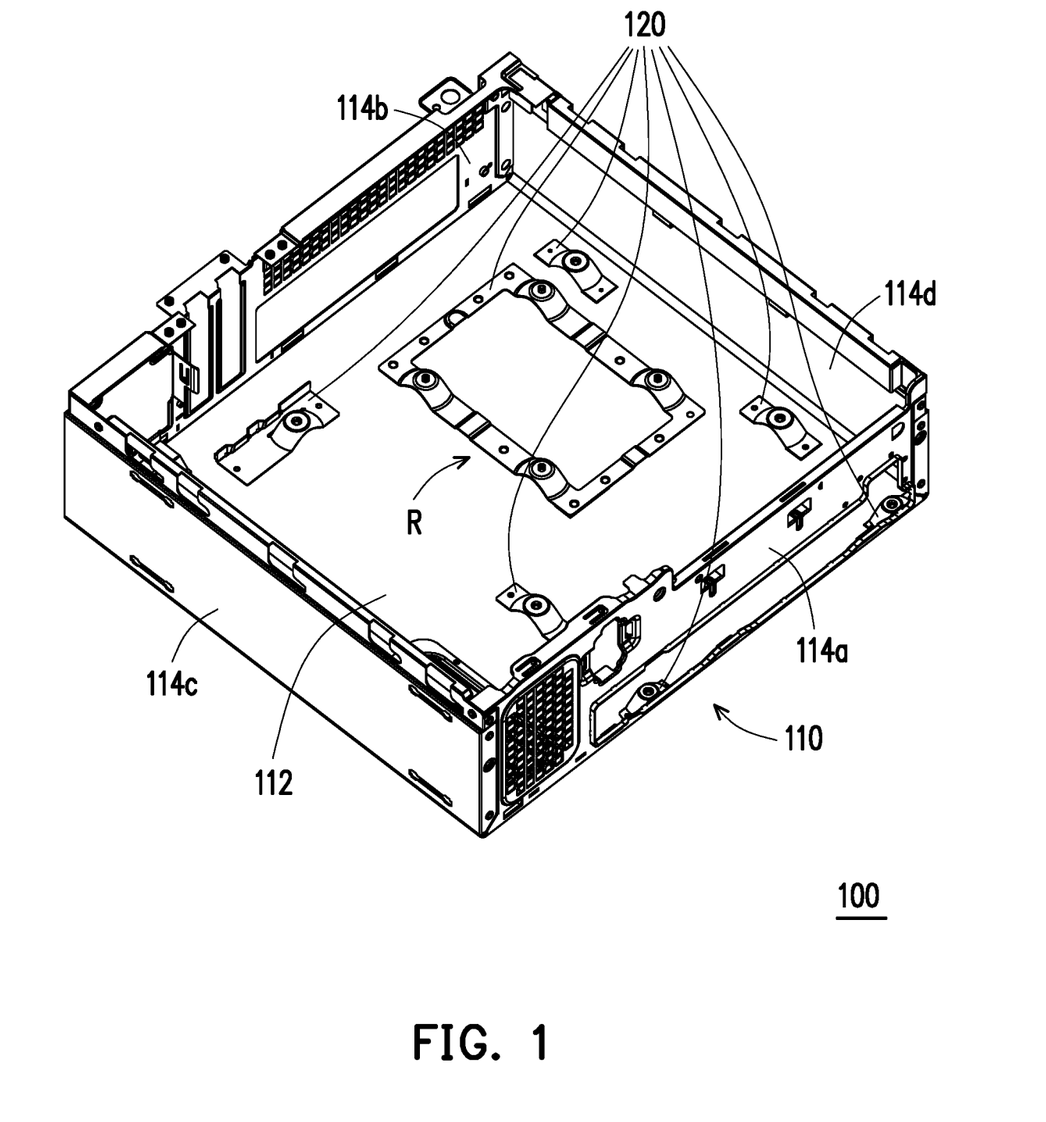
FIG. 1 is a perspective view illustrating a chassis structure according to an embodiment of the invention.
Figure 2:
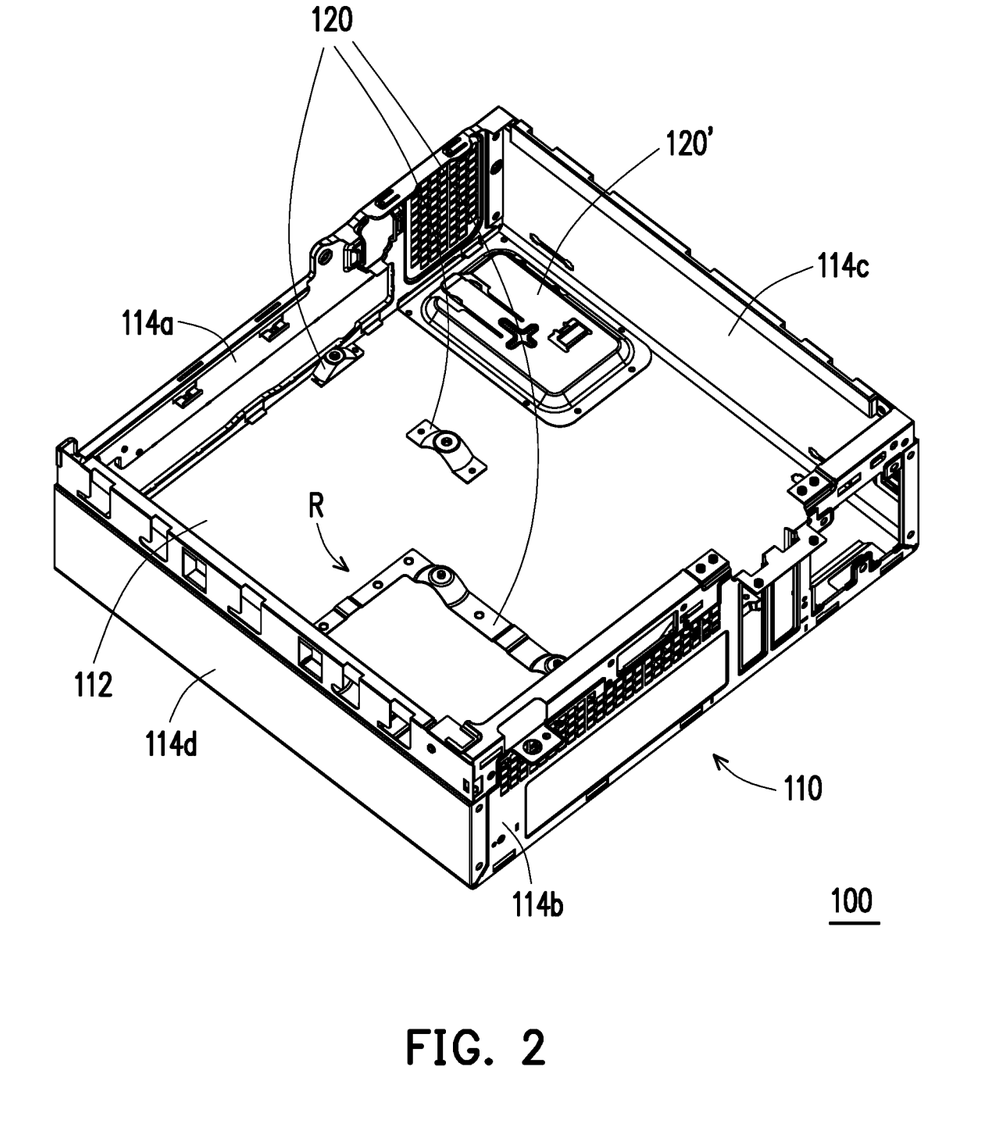
FIG. 2 is a perspective view illustrating the chassis structure of FIG. 1 from another perspective.
Figure 3:
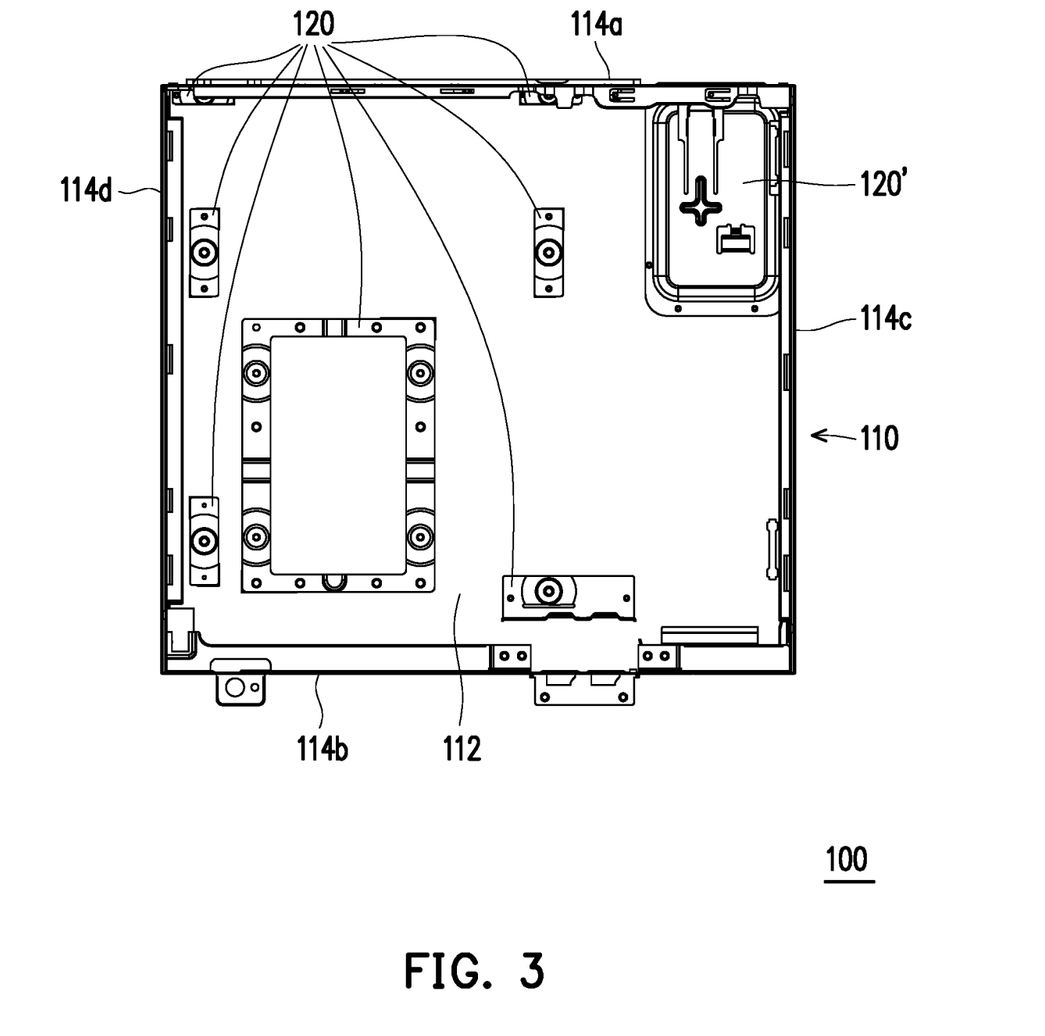
FIG. 3 is a top view illustrating the chassis structure of FIG. 1.

FIG. 1 is a perspective view illustrating a chassis structure according to an embodiment of the invention. FIG. 2 is a perspective view illustrating the chassis structure of FIG. 1 from another perspective. FIG. 3 is a top view illustrating the chassis structure of FIG. 1. Referring to FIG. 1 to FIG. 3, a chassis structure 100 of the present embodiment includes a box body 110 and a plurality of assembling components 120. The box body 110 includes a main plate 112 and a plurality of side plates 114a to 114d, wherein the side plates 114a to 114d surround a periphery of the main plate 112 and define an accommodating space. The assembling components 120 are bonded to the main plate 112 and are located in the accommodating space.

In the embodiments of the invention, the box body 110 is formed of one single metal component to provide an integral box body 110 (i.e., the main plate 112 and the side plates 114a to 114d form an integral structure). Different from the conventional designs where two metal components are stacked to form the box body, the present embodiment saves manufacturing costs and meanwhile simplifies the manufacturing process. To accommodate the design of the integral box body, the assembling components 120 are used in the embodiments of the invention to replace a mounting bracket in the conventional design and are disposed on the main plate 112 by bonding instead of being disposed by other methods such as screw locking and riveting that require penetrating through the main plate 112. Therefore, smoothness and neatness of an external surface of the main plate 112 can be maintained.

In the present embodiment, the main plate 112 is, for example, a rectangular main plate, and the side plates 114a to 114d are respectively connected to four edges of the rectangular main plate. The main plate 112 is integrally connected with the side plates 114a to 114d. The side plates 114a to 114d are simultaneously formed on the periphery of the main plate 112 and are bent in a stamping process, for example, and the side plates 114a to 114d are combined with each other by riveting, for example. Moreover, the assembling components 120 of the present embodiment are, for example, metal components, and the assembling components 120 are bonded to the main plate 112 through welding, for example. In other embodiments, the assembling components 120 may be bonded to the main plate 112 through other adequate bonding techniques, as long as the smoothness of the external surface of the main plate is not damaged.

Figure 4:
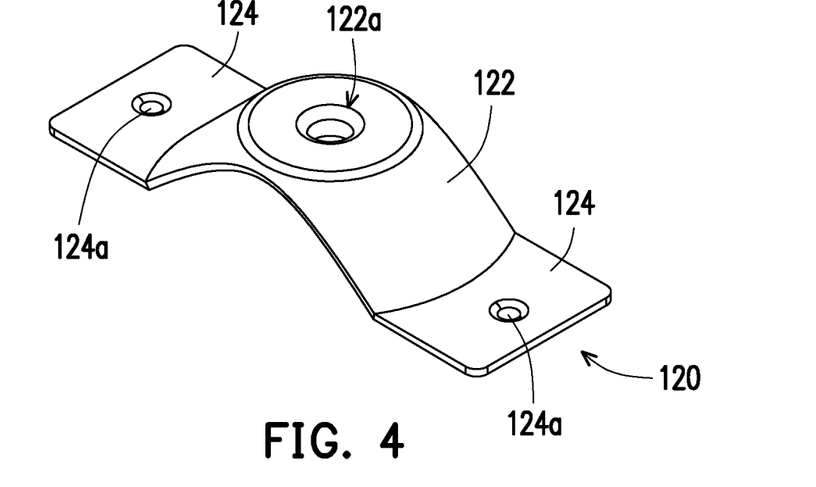
FIG. 4 is a perspective view illustrating an assembling component of FIG. 1.
Figure 5:
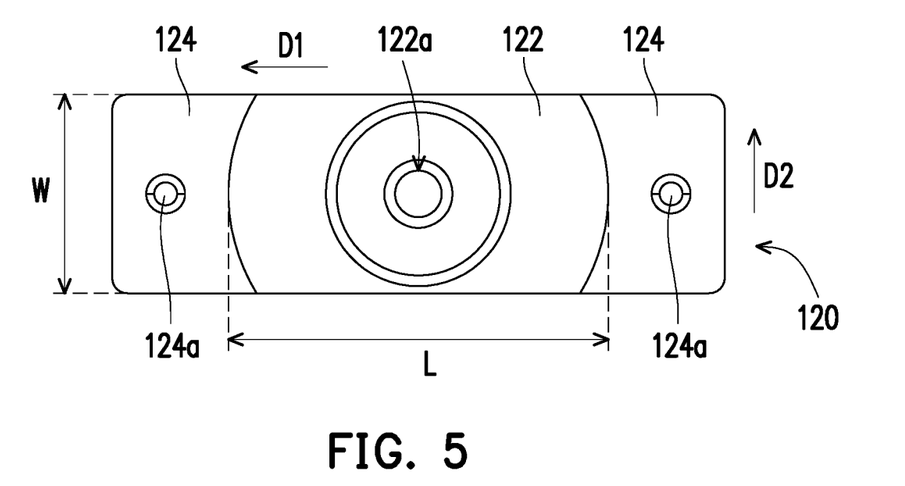
FIG. 5 is a top view illustrating the assembling component of FIG. 4.
Figure 6:
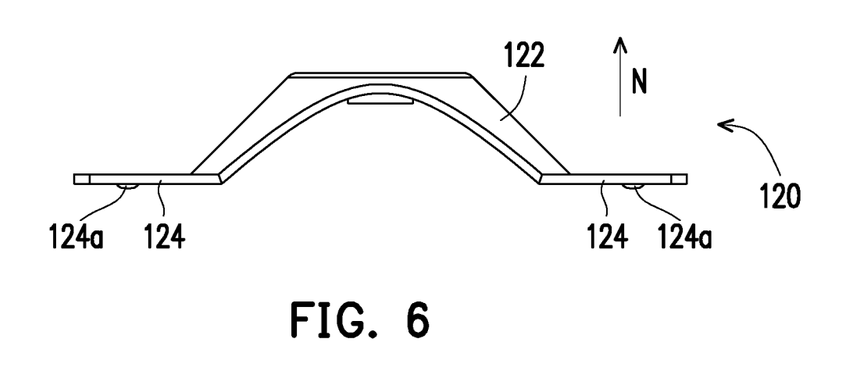
FIG. 6 is a side view illustrating the assembling component of FIG. 4.

Structures of the assembling components 120 will be illustrated in the description below. FIG. 4 is a perspective view illustrating the assembling component of FIG. 1. FIG. 5 is a top view illustrating the assembling component of FIG. 4. FIG. 6 is a side view illustrating the assembling component of FIG. 4. The assembling component 120 includes an assembling portion 122 and a plurality of bonding portions 124, wherein the bonding portions 124 are located around the assembling portion 122 to be bonded with the main plate 112. For example, as shown in FIG. 4 to FIG. 6, at least one assembling component 120 includes one assembling portion 122 and two bonding portions 124, wherein the bonding portions 124 are respectively connected to two sides of the assembling portion 122 (illustrated in FIG. 1 to FIG. 3), and an assembling hole 122a is provided on the assembling portion 122 to be used in subsequent combination with an electronic component. The electronic component is, for example, a circuit board, and the assembling portions 122 of a plurality of assembling components 120 are used to collectively assemble the circuit board. Moreover, an assembling component 120' as shown in FIG. 2 and FIG. 3 may be used to assemble an electronic component that is not a circuit board, e.g., a power supply unit (PSU).

As shown in FIG. 5, the assembling portion 122 and the two bonding portions 124 are connected to each other along a first direction D1, and a length L of the assembling portion 122 along the first direction D1 is greater than a width W of the assembling component 120 along a second direction D2 perpendicular to the first direction D1. Through such design, the width W of the assembling component 120 along the second direction D2 is not excessively large so as not to occupy an excessive configuration area on the main plate 112. However, the invention is not limited hereto, and the width W along the second direction D2 may be equal to or greater than the length L so as to provide a larger bonding area and increase bonding security of the assembling component 120. Moreover, depending on requirement of a user, the two bonding portions 124 on the assembling portion 122 may also extend in different directions. In addition, in the same assembling component 120, the number of the bonding portions 124 is not limited to two and may be more than two.

As shown in FIG. 6, the assembling portion 122 is, for example, a bump and extends from the bonding portions 124 along a direction N away from the main plate 112 (illustrated in FIG. 1 to FIG. 3) to lift the corresponding electronic component (e.g., a circuit board) away from the main plate 112. Moreover, a height of each of the bonding portions 124 along the direction N perpendicular to the main plate 112 is, for example, 3 to 15 mm, but the invention is not limited hereto.

As shown in FIG. 4 to FIG. 6, each of the bonding portions 124 of the assembling component 120 has a recessed portion 124a. When the bonding portion 124 is bonded to the main plate 112 through welding, peripheral material of the recessed portion 124a is melted by a high temperature and is bonded to the main plate 112. By gathering the melted portion in the recessed portion 124a, irregular melting is prevented from occurring in other regions of the bonding portion 124. However, the invention is not limited hereto, and bonding may also be performed by using an added bonding material (a solder), as long as the smoothness of the external surface of the main plate is not damaged.

Moreover, one assembling component 120 may include a plurality of assembling portions 122. Furthermore, the assembling component 120 may form an annular structure R, and it is preferable that the annular structure R is integrally formed to thereby save the manufacturing time and costs. For example, FIG. 2 illustrates an annular structure R including four assembling portions 122. However, the annular structure R is not limited to the shape illustrated in FIG. 2 and may be any adequate annular component. Conversely, a plurality of individual assembling components 120 may be arranged to form the annular structure R, and the assembling components 120 may be connected to or separate from each other. Any modifications similar to those described above fall within the scope of the invention.

Figure 7:
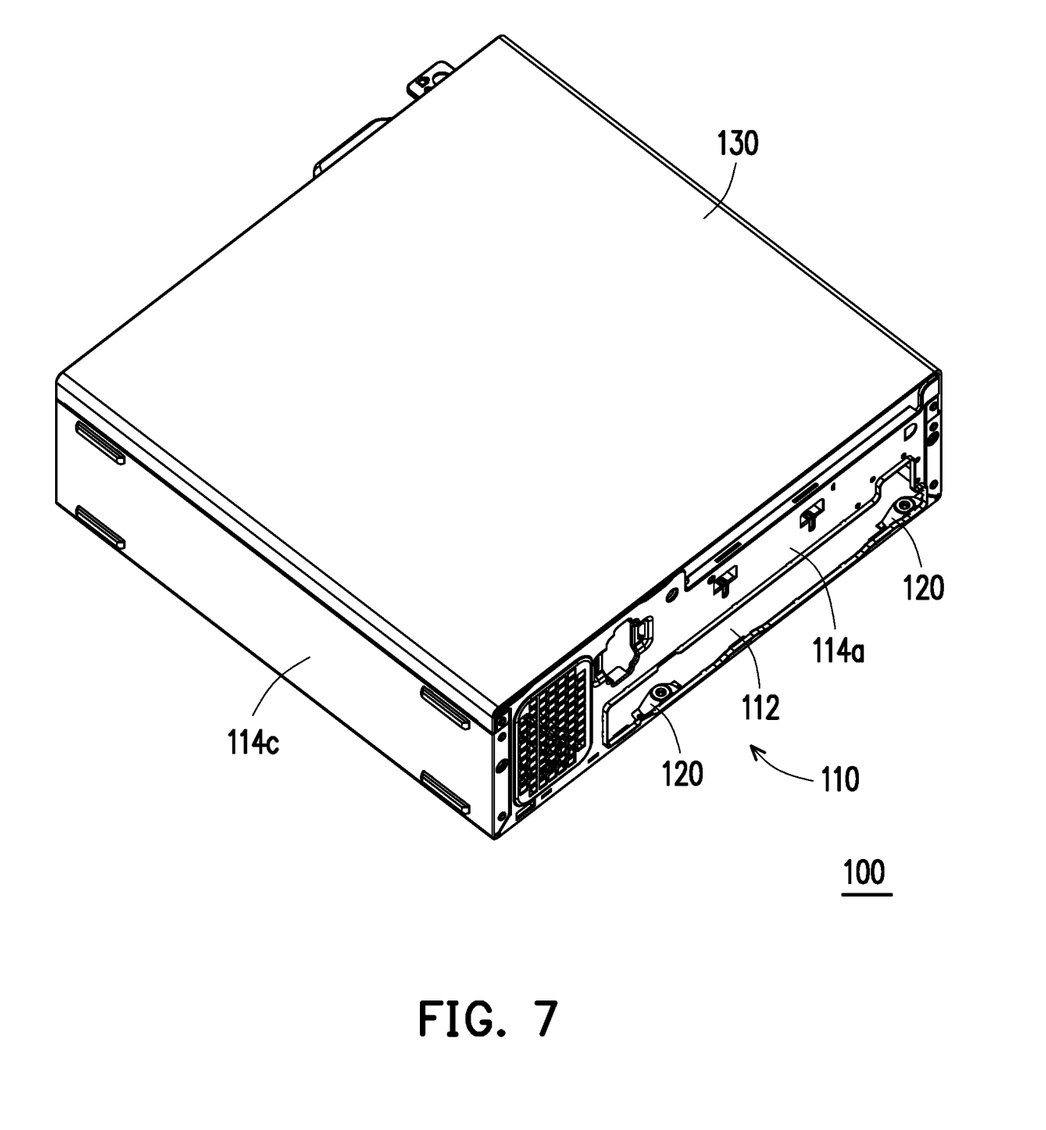
FIG. 7 illustrates assembly of a box body of FIG. 1 with a cover plate.

FIG. 7 illustrates assembly of the box body of FIG. 1 with a cover plate. Referring to FIG. 7, the chassis structure 100 further includes a cover plate 130, and the cover plate 130 is assembled to the side plates 114a to 114d to cover the accommodating space defined by the side plates 114a to 114d to shield the electronic components in the chassis structure 100. The cover plate 130 is, for example, another main plate of the host chassis.

Figure 8:
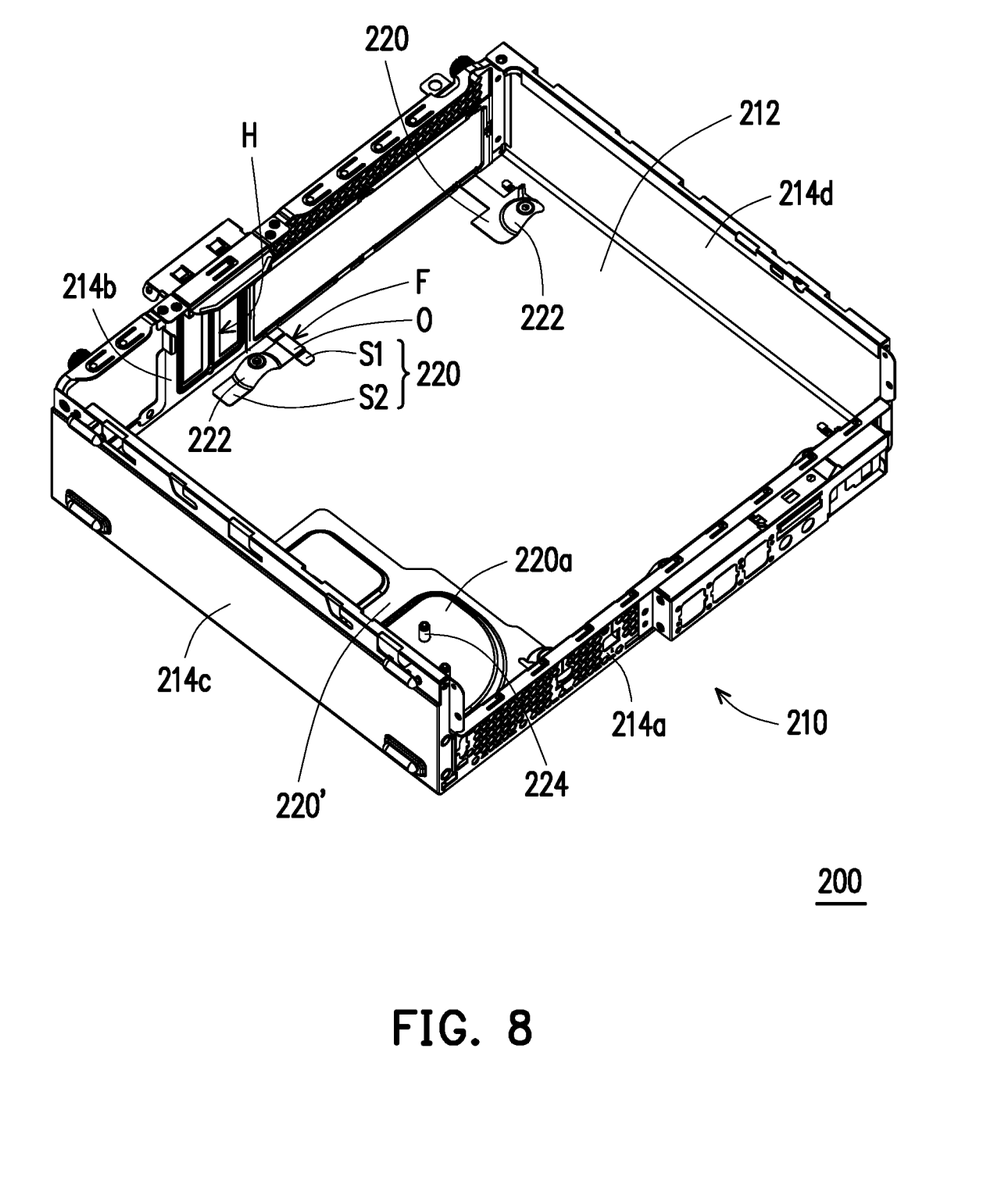
FIG. 8 is a perspective view illustrating a chassis structure according to another embodiment of the invention.
Figure 9:
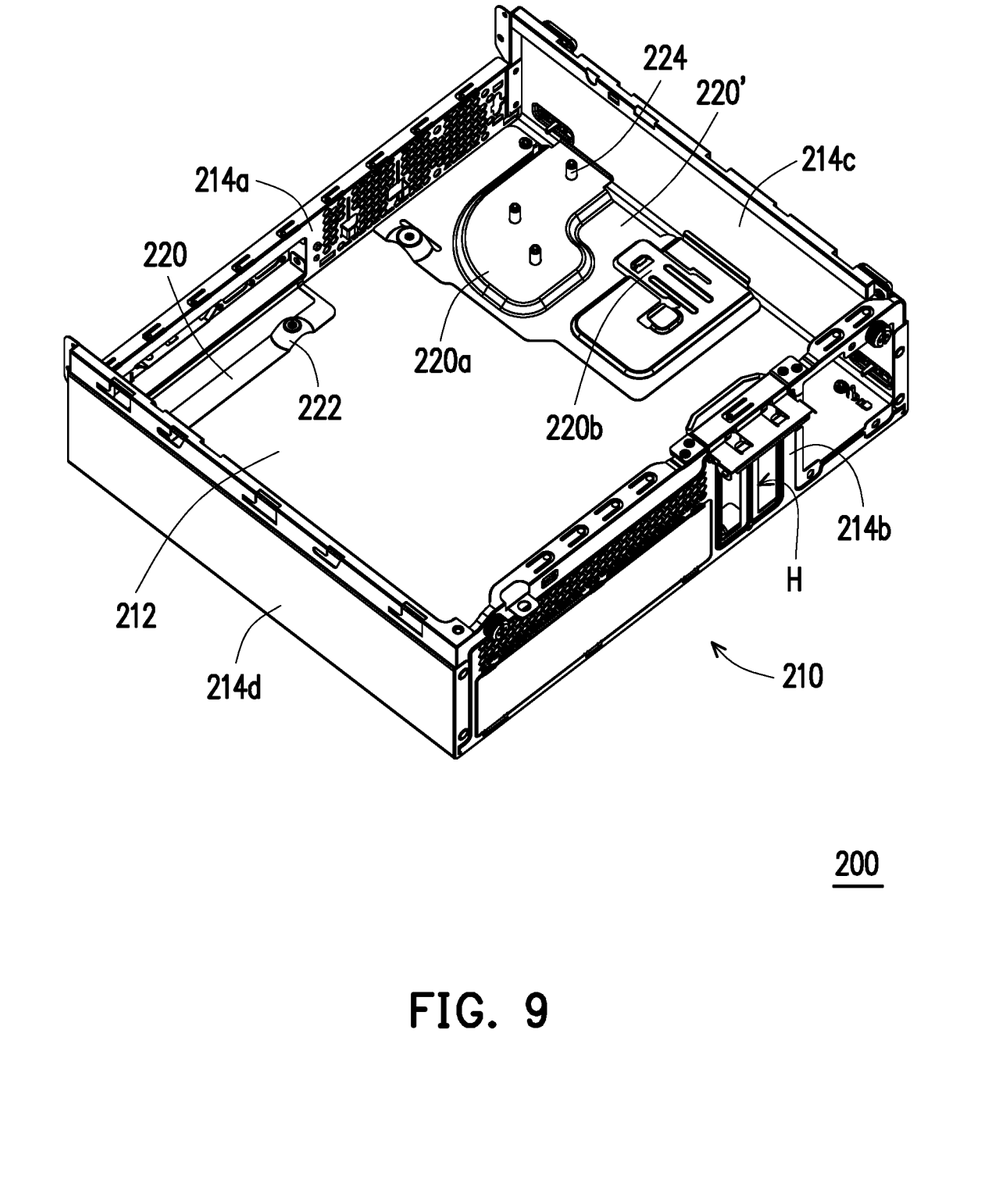
FIG. 9 is a perspective view illustrating the chassis structure of FIG. 8 from another perspective.
Figure 10:
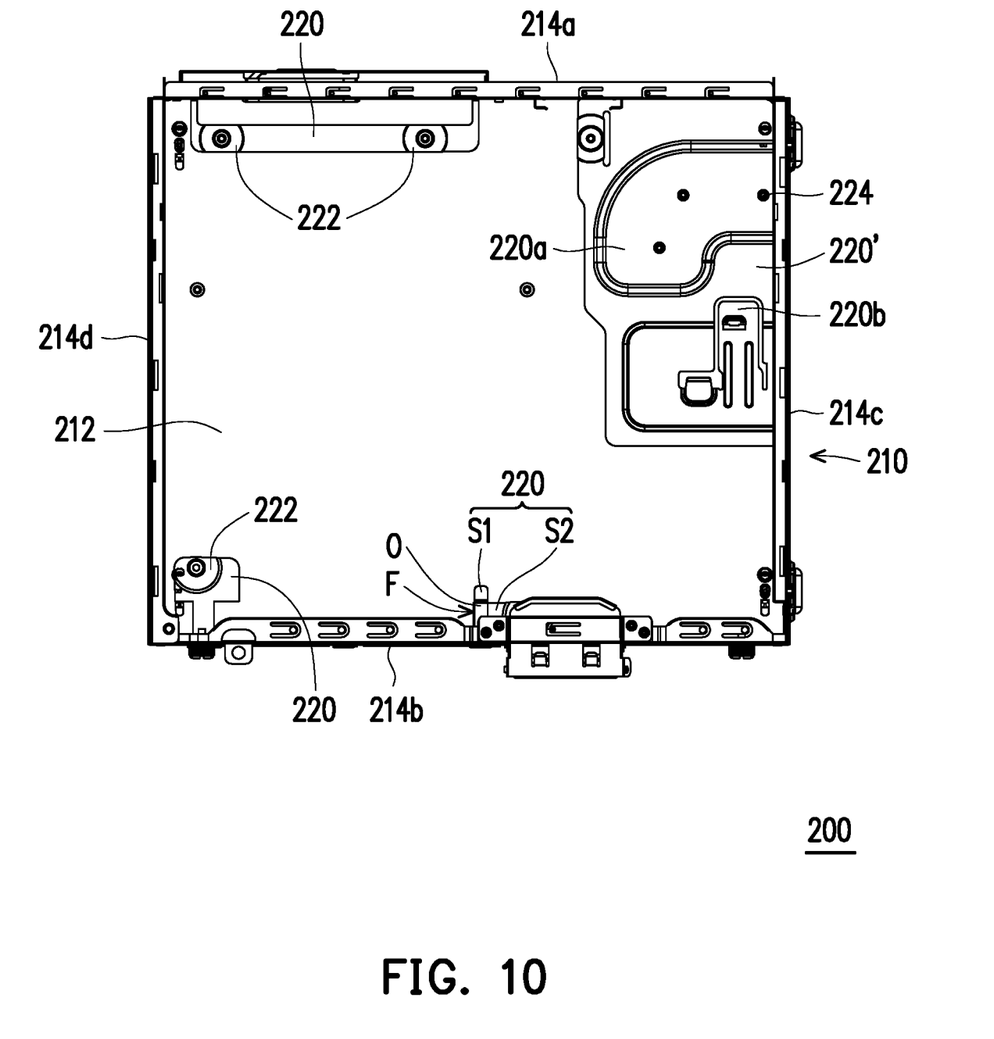
FIG. 10 is a top view illustrating the chassis structure of FIG. 8.

FIG. 8 is a perspective view illustrating a chassis structure according to another embodiment of the invention. FIG. 9 is a perspective view illustrating the chassis structure of FIG. 8 from another perspective. FIG. 10 is a top view illustrating the chassis structure of FIG. 8. In a chassis structure 200 shown in FIG. 8 to FIG. 10, configurations and functions of a box body 210, a main plate 212, and side plates 214a to 214d are similar to configurations and functions of the box body 110, the main plate 112, and the side plates 114a to 114d shown in FIG. 1 to FIG. 3 and shall not be repeatedly described here. A difference between the chassis structure 200 and the chassis structure 100 lies in that some assembling components 220 are formed by bending partial structures of the side plates 214 (i.e., the assembling components 220 and the side plates 214 form an integral structure) to further save material costs. Specifically, for example, a required assembling component base material is stamped on the side plate 214, and then the assembling component base material is bent towards the main plate 212 and is bonded to the main plate 212 to complete configuration of the assembling component 220.

Specifically, in the foregoing design, due to a relative relationship between the assembling component and a side plate opening portion, the stamped assembling component base material may be bent once or multiple times before it is bonded to the main plate, so that an assembling portion 222 can reach an expected configuration position. FIG. 8 and FIG. 10 illustrate that one assembling component 220 includes a first segment S1 and a second segment S2, and the first segment S1 and the second segment S2 are connected to each other. In the present embodiment, the first segment S1 is also connected to the side plate 214b. Therefore, a folded edge F is formed at a position where the first segment S1 and the second segment S2 meet, and, after bending, parts of regions of the first segment S1 and the second segment S2 overlap and form an overlap region O. Specifically, a required assembling component base material is stamped on the side plate, and then the first segment S1 is first bent towards the main plate 212 and is bonded to the main plate 212. Then, the second segment S2 is bent from the first segment S1 towards an expected configuration position, and the second segment S2 is bonded to the main plate 212, thereby completing configuration of the assembling component 220. Moreover, in some unillustrated embodiments, the second segment S2 may be bent first and then the first segment S1 is bent, such that a bonding operation is performed after the second segment S2 is closely attached to the expected configuration position. In the present embodiment, an extension direction of the first segment S1 is, for example, perpendicular to an extension direction of the second segment S2. However, the invention does not limit an included angle between the first segment S1 and the second segment S2, and the included angle may be modified according to the requirement of the user.

Referring to FIG. 9 and FIG. 10, an assembling component 220' of the present embodiment is not formed by bending the side plates 214a to 214d as in the case of the assembling component 220, but the assembling component 220' is independently manufactured and bonded to the main plate 212. Moreover, the assembling component 220' of the present embodiment includes a plurality of components, e.g., a cradle 220a on which studs 224 are provided, for assembling corresponding electronic components (e.g., an expansion card). In addition, the assembling component 220' also includes an engaging hook 220b for securing the power supply unit. Two side edges of the assembling component 220' respectively lean against the two adjacent side plates 214a, 214c to accurately position the assembling component 220'.

Figure 11:
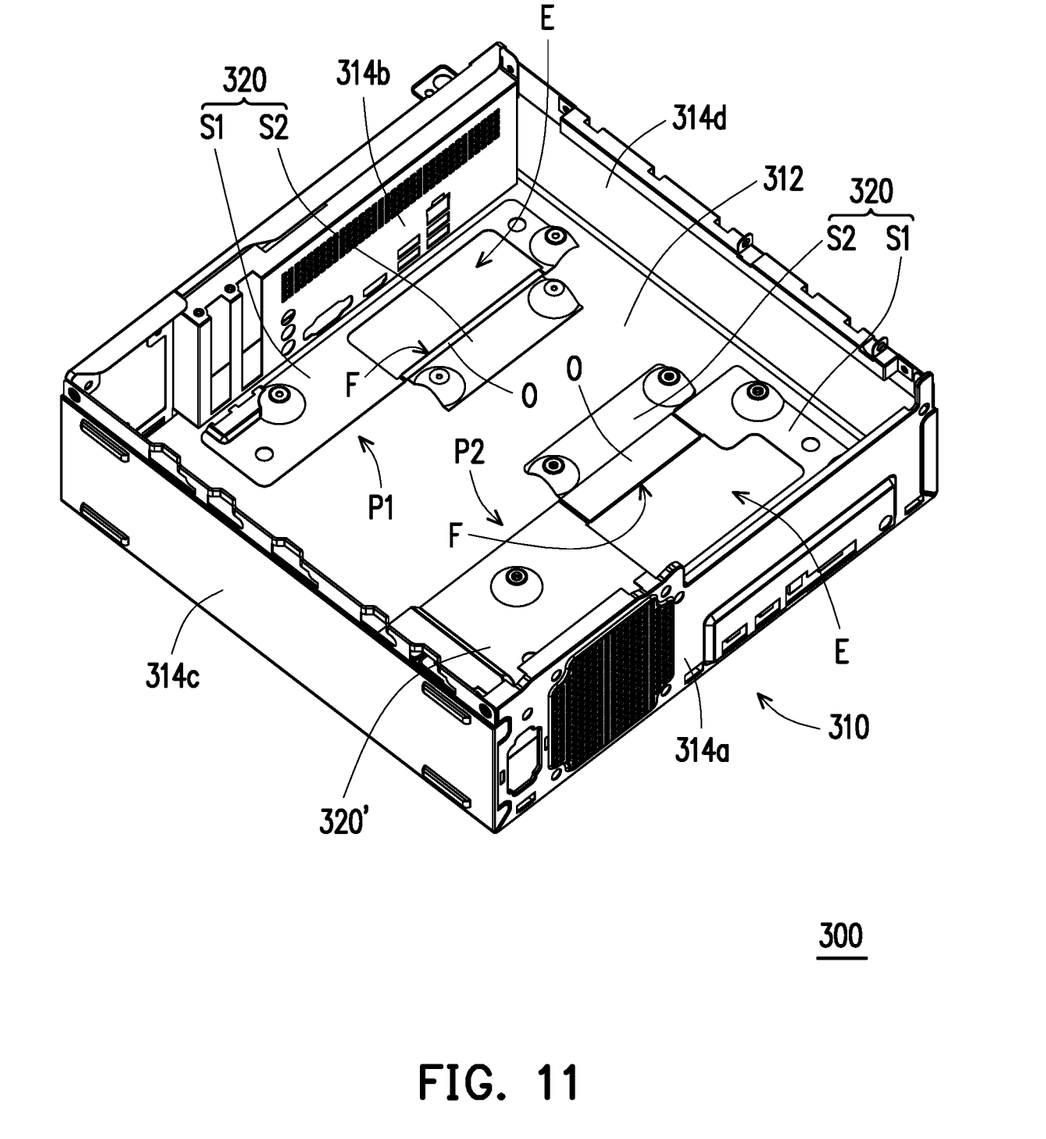
FIG. 11 is a perspective view illustrating a chassis structure according to another embodiment of the invention.
Figure 12:
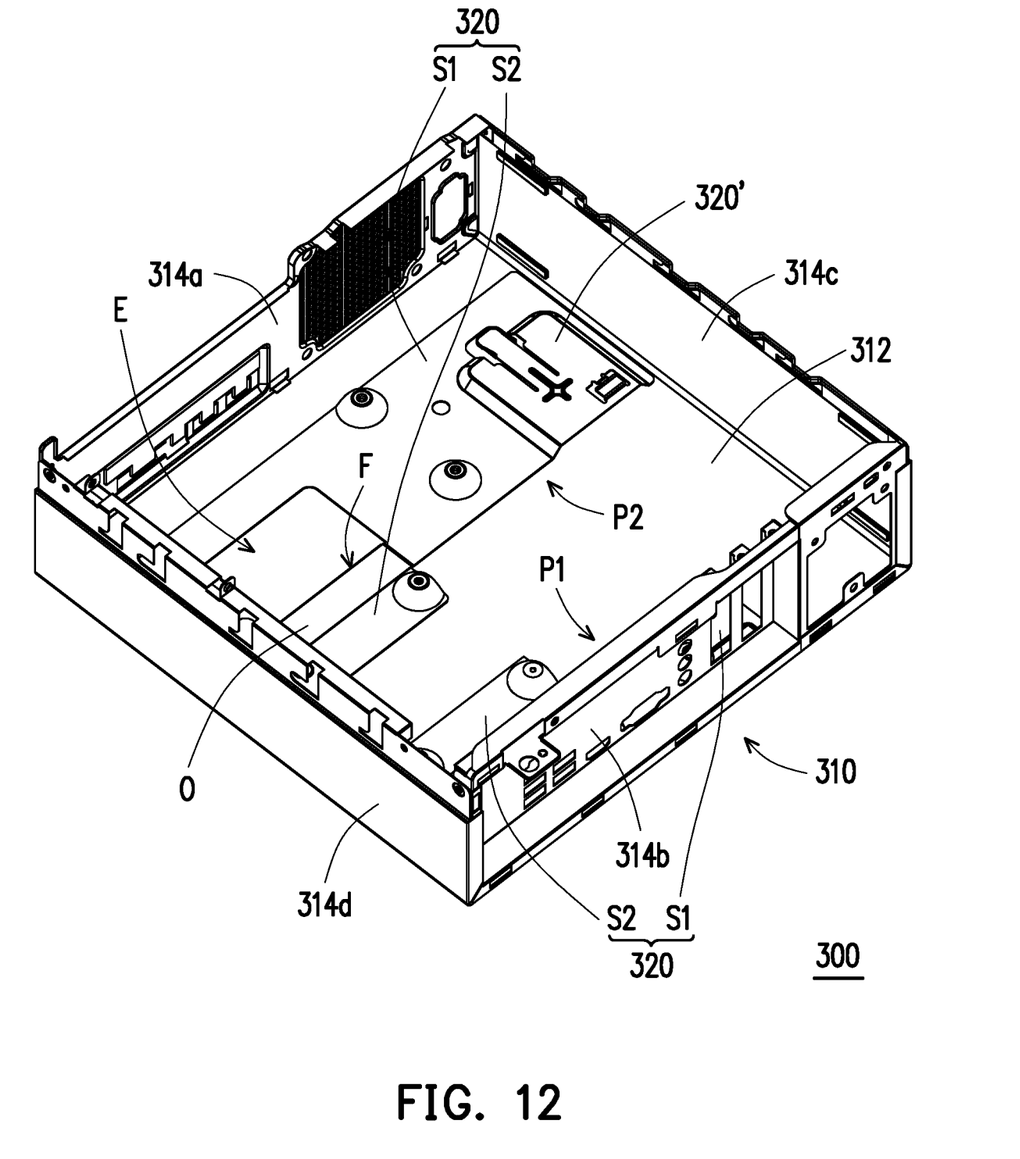
FIG. 12 is a perspective view illustrating the chassis structure of FIG. 11 from another perspective.
Figure 13:
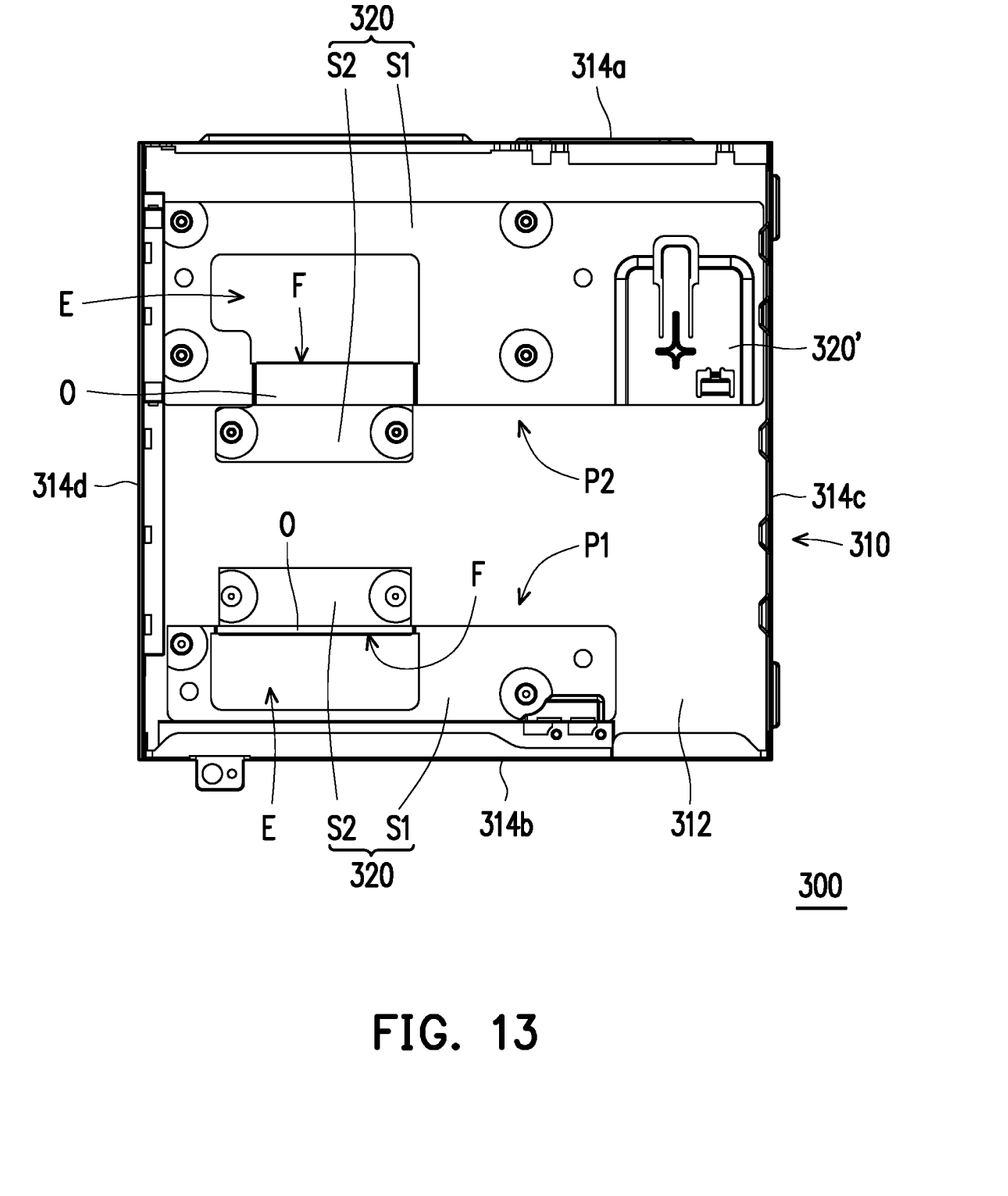
FIG. 13 is a top view illustrating the chassis structure of FIG. 11.

FIG. 11 is a perspective view illustrating a chassis structure according to another embodiment of the invention. FIG. 12 is a perspective view illustrating the chassis structure of FIG. 11 from another perspective. FIG. 13 is a top view illustrating the chassis structure of FIG. 11. In a chassis structure 300 shown in FIG. 11 to FIG. 13, configurations and functions of a box body 310, a main plate 312, and side plates 314a to 314d are similar to the configurations and functions of the box body 110, the main plate 112, and the side plates 114a to 114d shown in FIG. 1 to FIG. 3 and shall not be repeatedly described here. A difference between the chassis structure 300 and the chassis structure 100 lies in that an assembling component 320 is a plate-shaped structure P1 formed by stamping and bending an individual metal plate and is subsequently bonded to the main plate 312. Therefore, the assembling component 320 includes a first segment S1 and a second segment S2, and the first segment S1 and the second segment S2 are connected to each other. Specifically, a folded edge F is formed at a position where the first segment S1 and the second segment S2 meet, and, after bending, parts of regions of the first segment S1 and the second segment S2 overlap and form an overlap region O. More specifically, since a formation material of the second segment S2 in the assembling component 320 is entirely formed by stamping the first segment S1, the first segment S1 has an hollow region E corresponding to the second segment S2, and a shape of the hollow region E largely corresponds to a shape of the second segment S2. Depending on a relationship of configuration between the first segment S1 and the second segment S2, the hollow region E may be closed or open. Another assembling component 320' is also a plate-shaped structure P2, and a difference lies in that an engaging hook for securing the power supply unit is also formed in part of space of the assembling component 320'. By integrating a plurality of assembling components in a plate-shaped structure as described above, it is possible to reduce the number of the assembling components to simplify the manufacturing process.

Although the invention is disclosed as the embodiments above, the embodiments are not meant to limit the invention.

Any person skilled in the art may make slight modifications and variations without departing from the spirit and scope of the invention. Therefore, the protection scope of the invention shall be defined by the claims attached below.

What is claimed is:

1. A chassis structure comprising:
   a box body comprising a main plate and a plurality of side plates, wherein the side plates surround a periphery of the main plate and define an accommodating space; and
   a plurality of assembling components bonded to the main plate and located in the accommodating space, wherein each of the assembling components comprises an assembling portion and two bonding portions,
   wherein at least one of the assembling components and at least one of the side plates are integrally formed by one single metal component.

2. The chassis structure according to claim 1, wherein the main plate and the side plates form an integral structure.

3. The chassis structure according to claim 2, wherein the side plates are combined with each other by riveting.

4. The chassis structure according to claim 1, wherein the assembling portion comprises a bump.

5. The chassis structure according to claim 1, wherein the assembling portion comprises an assembling hole.

6. The chassis structure according to claim 1, wherein each of the bonding portions comprises a recessed portion.

7. The chassis structure according to claim 1, wherein the assembling portion and the bonding portions are connected to each other along a first direction, and a length of the assembling portion along the first direction is greater than a width of each of the assembling components along a second direction perpendicular to the first direction.

8. The chassis structure according to claim 1, wherein at least one of the assembling components comprises a first segment and a second segment, and the first segment and the second segment are connected to each other.

9. The chassis structure according to claim 8, wherein the first segment has a hollow region.

10. The chassis structure according to claim 9, wherein a shape of the hollow region corresponds to a shape of the second segment.

11. The chassis structure according to claim 9, wherein the hollow region is closed.

12. The chassis structure according to claim 8, wherein the first segment is connected to the side plates.

13. The chassis structure according to claim 8, wherein the at least one of the assembling components comprises a folded edge.

14. The chassis structure according to claim 8, wherein the at least one of the assembling components comprises an overlap region.

15. The chassis structure according to claim 8, wherein an extension direction of the first segment is perpendicular to an extension direction of the second segment.

16. The chassis structure according to claim 1, wherein at least one of the assembling components comprises an annular structure.

17. The chassis structure according to claim 1, wherein at least one of the assembling components comprises a cradle.

18. The chassis structure according to claim 1, wherein at least one of the assembling components comprises an engaging hook.

* * * * *